(12) United States Patent
Hamada et al.

(10) Patent No.: US 10,423,003 B2
(45) Date of Patent: Sep. 24, 2019

(54) PHOTOGRAPHING OPTICAL DEVICE

(71) Applicant: NIDEC SANKYO CORPORATION, Suwa-gun, Nagano (JP)

(72) Inventors: Yoshihiro Hamada, Nagano (JP); Tatsuki Wade, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 677 days.

(21) Appl. No.: 14/648,484

(22) PCT Filed: Aug. 20, 2013

(86) PCT No.: PCT/JP2013/072169
§ 371 (c)(1),
(2) Date: May 29, 2015

(87) PCT Pub. No.: WO2014/083894
PCT Pub. Date: Jun. 5, 2014

(65) Prior Publication Data
US 2015/0293372 A1   Oct. 15, 2015

(30) Foreign Application Priority Data

Nov. 29, 2012   (JP) .................................. 2012-260756

(51) Int. Cl.
    *G02B 27/64* (2006.01)
    *G03B 5/00* (2006.01)
    *H04N 5/225* (2006.01)
(52) U.S. Cl.
    CPC ............ *G02B 27/646* (2013.01); *G03B 5/00* (2013.01); *H04N 5/2254* (2013.01); *G03B 2205/0007* (2013.01); *G03B 2205/0069* (2013.01)

(58) Field of Classification Search
    CPC ........ G02B 27/64; G02B 27/646; G03B 5/00; G03B 2205/00; G03B 2205/0007–0038;
    (Continued)

(56) References Cited

U.S. PATENT DOCUMENTS

| 9,287,027 | B2 * | 3/2016 | Miyao ....................... C22C 9/00 |
| 9,459,464 | B2 * | 10/2016 | Minamisawa ........... G02B 7/08 |
| 2014/0028863 | A1 * | 1/2014 | Takei ....................... G03B 5/00 |
| | | | 348/208.11 |

FOREIGN PATENT DOCUMENTS

| JP | 2010122662 A | * | 6/2010 | ............... G03B 5/00 |
| JP | 2011065140 A |   | 3/2011 | |

(Continued)

OTHER PUBLICATIONS

International Search Report corresponding to Application No. PCT/JP2013/072169; dated Dec. 3, 2013. with English translation.

*Primary Examiner* — Jade R Chwasz
*Assistant Examiner* — Jyotsna V Dabbi
(74) *Attorney, Agent, or Firm* — Cantor Colburn LLP

(57) ABSTRACT

A photographing optical device may include a movable module including a movable body and a holding body; a support body to hold the movable module; a lens drive coil attached to the movable body; a shake correction coil attached to the support body, and a plurality of drive magnets attached to the holding body. The holding body may include a first magnet fixing member and a second magnet fixing member. The first magnet fixing member and the second magnet fixing member may be formed in a frame shape. The movable body may be disposed on inner peripheral sides of the first magnet fixing member and the second magnet fixing member. The support body may include a case body structuring an outer peripheral face of the support (Continued)

body. An object side end of the case body may include a facing part which faces an end face of the movable body.

13 Claims, 7 Drawing Sheets

(58) Field of Classification Search
CPC .... G03B 2205/0069; G03B 2205/0053; G03B 2217/002–005; G03B 2217/18–185; H04N 5/2253; H04N 5/2254; H04N 5/23248–23287
USPC .............. 359/554–557, 823, 824; 348/208.7, 348/208.11, 208.99; 396/52–55
See application file for complete search history.

(56) References Cited

FOREIGN PATENT DOCUMENTS

| | | | | |
|---|---|---|---|---|
| JP | 2011133702 A | | 7/2011 | |
| JP | 2011203476 A | * | 10/2011 | ............... G03B 5/00 |
| JP | 2011203476 A | | 10/2011 | |
| JP | WO201214011 A1 | * | 10/2012 | ............... G03B 5/00 |
| WO | WO2009139055 A1 | * | 11/2009 | ............ H01F 1/053 |
| WO | WO2011078040 A1 | * | 6/2011 | ............... G02B 7/04 |

\* cited by examiner

Fig. 1
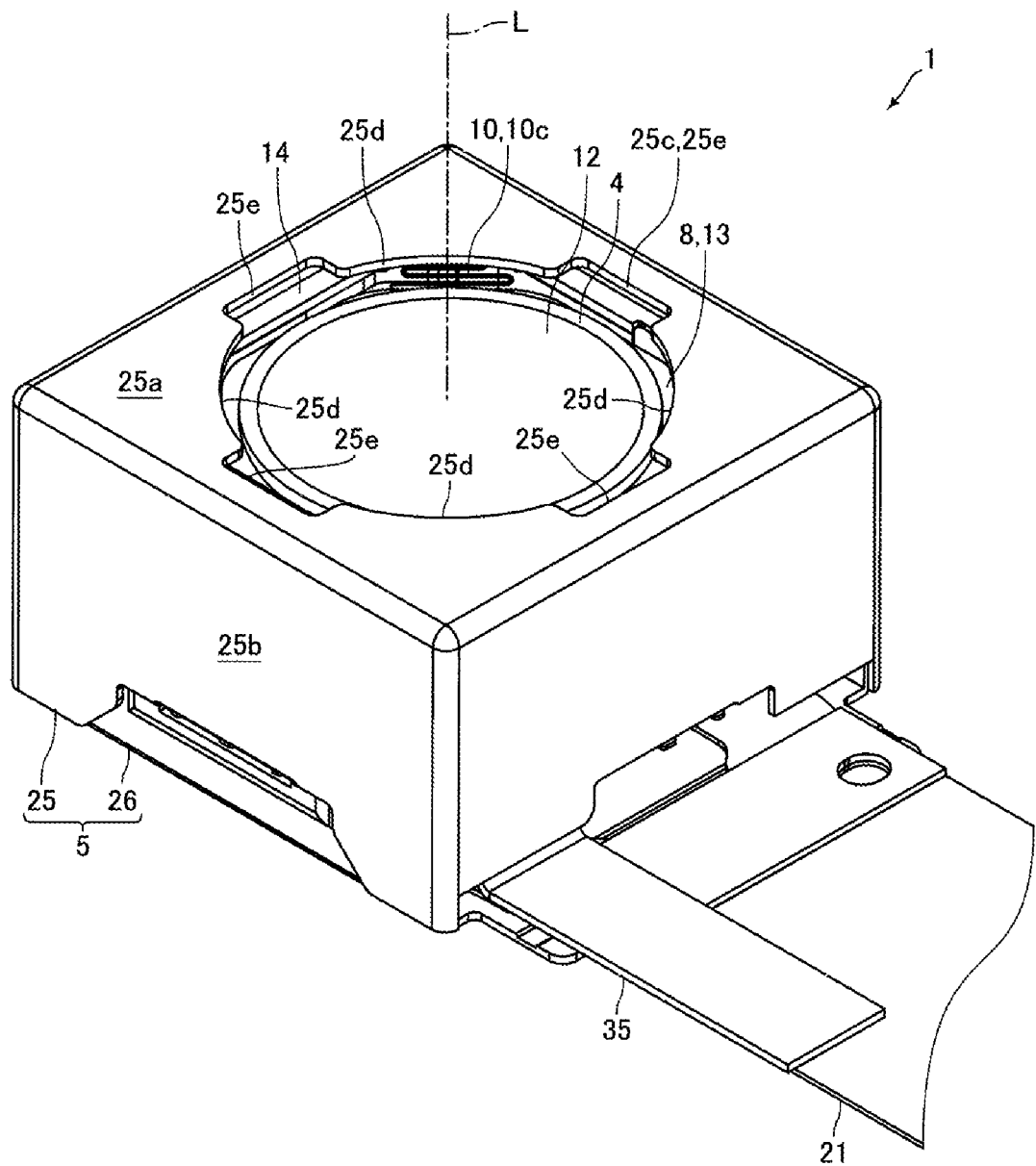
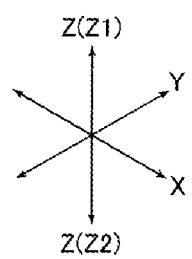

PHOTOGRAPHING OPTICAL DEVICE

CROSS REFERENCE TO PRIOR APPLICATIONS

This is the U.S. national stage of application No. PCT/JP2013/072169, filed on Aug. 20, 2013. Priority under 35 U.S.C. § 119(a) and 35 U.S.C. § 365(b) is claimed from Japanese Application No. 2012-260756, filed Nov. 29, 2012, the disclosures of which are incorporated herein by reference.

FIELD OF THE INVENTION

The present invention relates to a photographing optical device having a shake correction function structured to swing a movable module on which a lens and an imaging element are mounted to correct a shake.

BACKGROUND

Conventionally, a photographing optical device has been known which is provided with a shake correction function structured to swing a movable module on which a lens and an imaging element are mounted to correct a shake (see, for example, Patent Literature 1). The photographing optical device described in Patent Literature 1 includes a movable module on which a lens and an imaging element are mounted and a support body which swingably supports the movable module.

In the photographing optical device, the movable module includes a movable body which holds a lens and is movable in an optical axis direction of the lens, and a holding body which movably holds the movable body in the optical axis direction. The holding body is provided with a cover member structuring a part of an outer peripheral face of the movable module. The cover member is formed in a substantially bottomed rectangular tube shape having a bottom part and a tube part, and the bottom part is disposed on an object side with respect to the movable body. The bottom part of the cover member is capable of abutting with a part of an end face on an object side of the movable body. The bottom part of the cover member functions to restrict a movable range of the movable body to an object side when an impact is applied to the photographing optical device and prevents damage of a plate spring which connects the movable body with the holding body.

Further, in the photographing optical device, the support body is provided with a case body structuring an outer peripheral face of the photographing optical device. The case body is formed in a substantially bottomed rectangular tube shape having a bottom part and a tube part and the bottom part structures an end face on an anti-object side of the photographing optical device. An end face on an object side of the case body is disposed on an object side relative to the bottom part of the cover member.

PATENT LITERATURE

[PTL 1] Japanese Patent Laid-Open No. 2011-203476

In a market of a portable apparatus such as a cell phone on which the photographing optical device described in Patent Literature 1 is mounted, a demand for making the apparatus thinner has been further increased in recent years. Therefore, a demand for making thinner a photographing optical device which is mounted on a portable apparatus is also increased.

SUMMARY

In view of the problem described above, at least an embodiment of the present invention provides a photographing optical device which is capable of being made thinner in comparison with the conventional device.

To achieve the above, at least an embodiment of the present invention provides a photographing optical device including a movable module having a movable body which holds a lens and is movable in an optical axis direction of the lens and a holding body structured to movably hold the movable body in the optical axis direction, a support body structured to swingably hold the movable module, a lens drive coil which is attached to the movable body, a shake correction coil which is attached to the support body, and a plurality of drive magnets having a first opposed face which faces the lens drive coil and a second opposed face which faces the shake correction coil, the drive magnets being attached to the holding body. When one side in the optical axis direction is an object side and the other side in the optical axis direction is an anti-object side, the holding body includes a first magnet fixing member to which end faces on the object side of the plurality of the drive magnets are fixed, and a second magnet fixing member to which end faces on the anti-object side of the plurality of the drive magnets are fixed. The first magnet fixing member and the second magnet fixing member are formed in a frame shape, the movable body is disposed on inner peripheral sides of the first magnet fixing member and the second magnet fixing member formed in the frame shape, the support body includes a case body structuring an outer peripheral face of the support body, and an object side end of the case body is formed with a facing part which faces a part of an end face on the object side of the movable body in the optical axis direction so as to be capable of abutting with the part of the end face on the object side of the movable body.

In the photographing optical device in accordance with at least an embodiment of the present invention, a support body which swingably holds a movable module includes a case body structuring an outer peripheral face of the support body. Further, in at least an embodiment of the present invention, a facing part which faces a part of an end face on an object side of the movable body in an optical axis direction is formed in an object side end of the case body so as to be capable of abutting with the part of the end face on the object side of the movable body. Therefore, according to at least an embodiment of the present invention, even in a case that the bottom part of the cover member included in the photographing optical device described in Patent Literature 1 is not provided, when an impact is applied to the photographing optical device, a movable range of the movable body on the object side can be restricted by utilizing the facing part of the case body. Accordingly, in at least an embodiment of the present invention, the size in the optical axis direction of the photographing optical device can be reduced by an amount of the bottom part of the cover member which is provided in the conventional photographing optical device. In other words, according to at least an embodiment of the present invention, the photographing optical device can be made further thinner in comparison with the conventional device.

Further, in at least an embodiment of the present invention, the lens drive mechanism for driving the movable body in the optical axis direction with respect to the holding body and the shake correction mechanism for swinging the movable module with respect to the support body to correct a shake are structured by using common drive magnets.

Therefore, the number of components can be reduced in comparison with a case that magnets for the lens drive mechanism and magnets for the shake correction mechanism are provided separately. Accordingly, in at least an embodiment of the present invention, the size of the photographing optical device can be also reduced in a radial direction which is perpendicular to the optical axis direction.

In at least an embodiment of the present invention, it is preferable that the photographing optical device includes a first plate spring which connects the movable module with the support body on the anti-object side, and the second magnet fixing member is formed so as to protrude to an outer peripheral side relative to the drive magnets. According to this structure, when an impact is applied to the photographing optical device, a swing range of the movable module in a direction perpendicular to the optical axis direction can be restricted by using the second magnet fixing member to prevent damage of the first plate spring. Therefore, in comparison with a case that, in addition to the second magnet fixing member, another member is separately provided for restricting a swing range of the movable module in a direction perpendicular to the optical axis direction, the structure of the photographing optical device can be simplified.

In at least an embodiment of the present invention, it is preferable that the photographing optical device includes second plate springs structured to connect the movable body with the holding body on both end sides of the movable body in the optical axis direction, the first magnet fixing member and the second magnet fixing member are formed in a substantially quadrangular frame shape when viewed in the optical axis direction, an outer peripheral face of the movable body is formed in a substantially octagonal shape when viewed in the optical axis direction, the second plate spring is provided with a movable body fixed part which is fixed to the movable body, a holding body fixed part which is fixed to the first magnet fixing member or the second magnet fixing member, and spring parts which are disposed between four corner portions of the first magnet fixing member or the second magnet fixing member and the movable body and are structured to connect the movable body fixed part with the holding body fixed part. According to this structure, the spring parts are disposed in spaces, which are normally dealt as dead spaces, between four corner portions of the first magnet fixing member and the second magnet fixing member and the movable body and thus the size of the photographing optical device can be reduced in a direction perpendicular to the optical axis direction. Alternatively, a diameter of the lens can be increased without increasing the size of the photographing optical device.

In at least an embodiment of the present invention, for example, the first magnet fixing member is provided with four corner parts in a substantially "L"-shape respectively structuring the four corner portions of the first magnet fixing member whose shape when viewed in the optical axis direction is a substantially quadrangular frame shape and four straight side parts in a straight shape connecting the corner parts, the holding body fixed part of the second plate spring connecting the movable body with the holding body on the object side of the movable body is fixed to a face on the anti-object side of the corner part, and a face on the object side of the corner part is disposed on the anti-object side relative to a face on the object side of the straight side part, and a face on the anti-object side of the corner part is disposed on the anti-object side relative to a face on the anti-object side of the straight side part. In this case, contacting of the corner part of the first magnet fixing member with the case body can be prevented when the movable module is swung. Further, in this case, an urging force of the movable body to an anti-object side can be increased by the second plate spring which connects the movable body with the holding body on the object side of the movable body.

In at least an embodiment of the present invention, it is preferable that the photographing optical device includes second plate springs structured to connect the movable body with the holding body on both end sides of the movable body in the optical axis direction, the first magnet fixing member is formed in a substantially quadrangular frame shape when viewed in the optical axis direction, the second plate spring which connects the movable body with the holding body on the object side of the movable body is provided with a movable body fixed part which is fixed to the movable body, holding body fixed parts which are fixed to the first magnet fixing member, and spring parts which connect the movable body fixed part with the holding body fixed parts, and the holding body fixed parts of the second plate spring which connect the movable body with the holding body on the object side of the movable body are fixed to faces on the object side of four corner portions of the first magnet fixing member whose shape when viewed in the optical axis direction is a substantially quadrangular frame shape.

In the movable module structuring the photographing optical device, when an electric current is not supplied to the lens drive coils, the movable body is commonly urged to the anti-object side by the second plate spring connecting the movable body with holding body on the object side of the movable body for holding the movable body at a predetermined reference position. Specifically, when the movable body is located at a reference position, the movable body fixed part is fixed to the movable body and the holding body fixed part is fixed to the first magnet fixing member so that the movable body fixed part of the second plate spring is disposed on the object side relative to the holding body fixed part. Therefore, when the holding body fixed part is fixed to faces on the anti-object side of four corner portions of the first magnet fixing member, the spring parts of the second plate spring may be interfered with the first magnet fixing member. On the other hand, in a case that the holding body fixed parts are fixed to faces on the object side of four corner portions of the first magnet fixing member, the spring parts and the first magnet fixing member can be prevented from being interfered with each other. Further, the holding body fixed parts of the second plate spring in a state that the movable body fixed part has been fixed to the movable body can be easily fixed to a face on the object side of the first magnet fixing member from the object side.

In at least an embodiment of the present invention, it is preferable that the movable body includes a sleeve whose outer peripheral face is wound around and fixed with the lens drive coil and a stopper which is fixed on the object side of the sleeve, the stopper is formed so as to enlarge to an outer peripheral side relative to the outer peripheral face of the sleeve, and at least a part of the stopper faces the facing part in the optical axis direction so as to be capable of abutting with the facing part. A through-hole for exposing a lens is formed in an object side end of the case body. Therefore, when the movable module is swung or, when the movable body is moved to an object side in a state that the movable module is inclined with respect to the support body, an end face on the object side of the movable body may be projected from the case body to the object side without abutting of the end face on the object side of the movable body with the facing part. However, according to this structure, when the movable module is swung or, when the movable body is moved to an object side in a state that the movable module is inclined with respect to the support body, the stopper which is fixed to the object side of the sleeve can be surely abutted with the facing part and thus the object side end of the movable body can be prevented from projecting from the case body to the object side.

In at least an embodiment of the present invention, it is preferable that the stopper is formed in a ring shape whose outer peripheral end is formed in a circular shape. According to this structure, even when the movable module is inclined in any direction with respect to the support body, the stopper can be surely abutted with the facing part.

In at least an embodiment of the present invention, it is preferable that the photographing optical device includes second plate springs structured to connect the movable body with the holding body on both end sides of the movable body in the optical axis direction, the second plate spring which connects the movable body with the holding body on the object side of the movable body is provided with a movable body fixed part which is fixed to the movable body, holding body fixed parts which are fixed to the first magnet fixing member, and spring parts which connect the movable body fixed part with the holding body fixed parts, and the movable body fixed part of the second plate spring which connects the movable body with the holding body on the object side of the movable body is fixed in a sandwiched state between a spring fixing face formed on the object side of the sleeve and the stopper in the optical axis direction. According to this structure, a fixed strength of the movable body fixed part can be increased.

In at least an embodiment of the present invention, for example, an end face on the object side of the case body where the facing part is formed is formed with a cut-out part for exposing a part of the first magnet fixing member when viewed in the optical axis direction. In this case, when the photographing optical device is to be assembled, aligning of the case body with the first magnet fixing member in the optical axis direction can be performed by utilizing an end face on the object side of the first magnet fixing member. In other words, at a time of assembling of the photographing optical device, aligning of the case body with the drive magnets in the optical axis direction can be performed by utilizing the end face on the object side of the first magnet fixing member.

In at least an embodiment of the present invention, it is preferable that surfaces of the drive magnet, the first magnet fixing member and the second magnet fixing member are formed with a nickel plated layer containing at least nickel, the first magnet fixing member and the drive magnet are joined to each other through a first joining layer which is made of tin based metal containing at least tin and is disposed between the first magnet fixing member and the drive magnet, and the second magnet fixing member and the drive magnet are joined to each other through a second joining layer which is made of tin based metal containing at least tin and is disposed between the second magnet fixing member and the drive magnet. According to this structure, for example, a tin plated layer which is formed so as to coat over a nickel plated layer on the surface of the drive magnet before joined to the first magnet fixing member and the second magnet fixing member is melted and solidified at the time of joining of the first magnet fixing member and the second magnet fixing member to the drive magnet and thereby the first joining layer and the second joining layer are formed and, in this manner, the first magnet fixing member and the second magnet fixing member and the drive magnet can be joined to each other. Therefore, protruding of the first joining layer and the second joining layer from between the first magnet fixing member and the second magnet fixing member and the drive magnet can be prevented.

As described above, according to at least an embodiment of the present invention, the photographing optical device can be made thinner in comparison with the conventional device.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 1 is a perspective view showing a photographing optical device in accordance with an embodiment of the present invention.

DESCRIPTION OF EMBODIMENTS

Embodiments of the present invention will be described below with reference to the accompanying drawings.
(Entire Structure of Photographing Optical Device)

Figure 2:
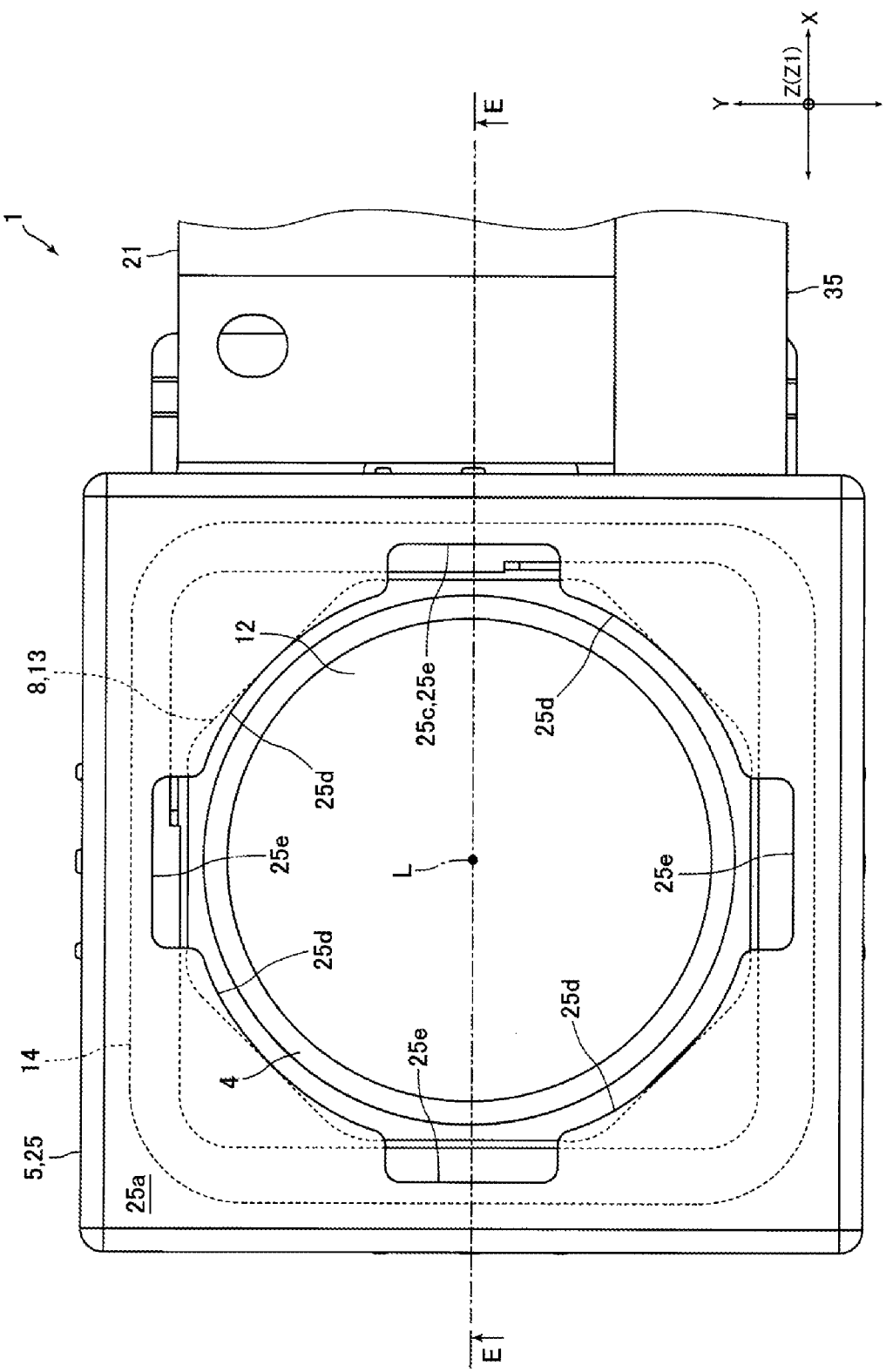
FIG. 2 is a plan view showing the photographing optical device in FIG. 1.
Figure 3:
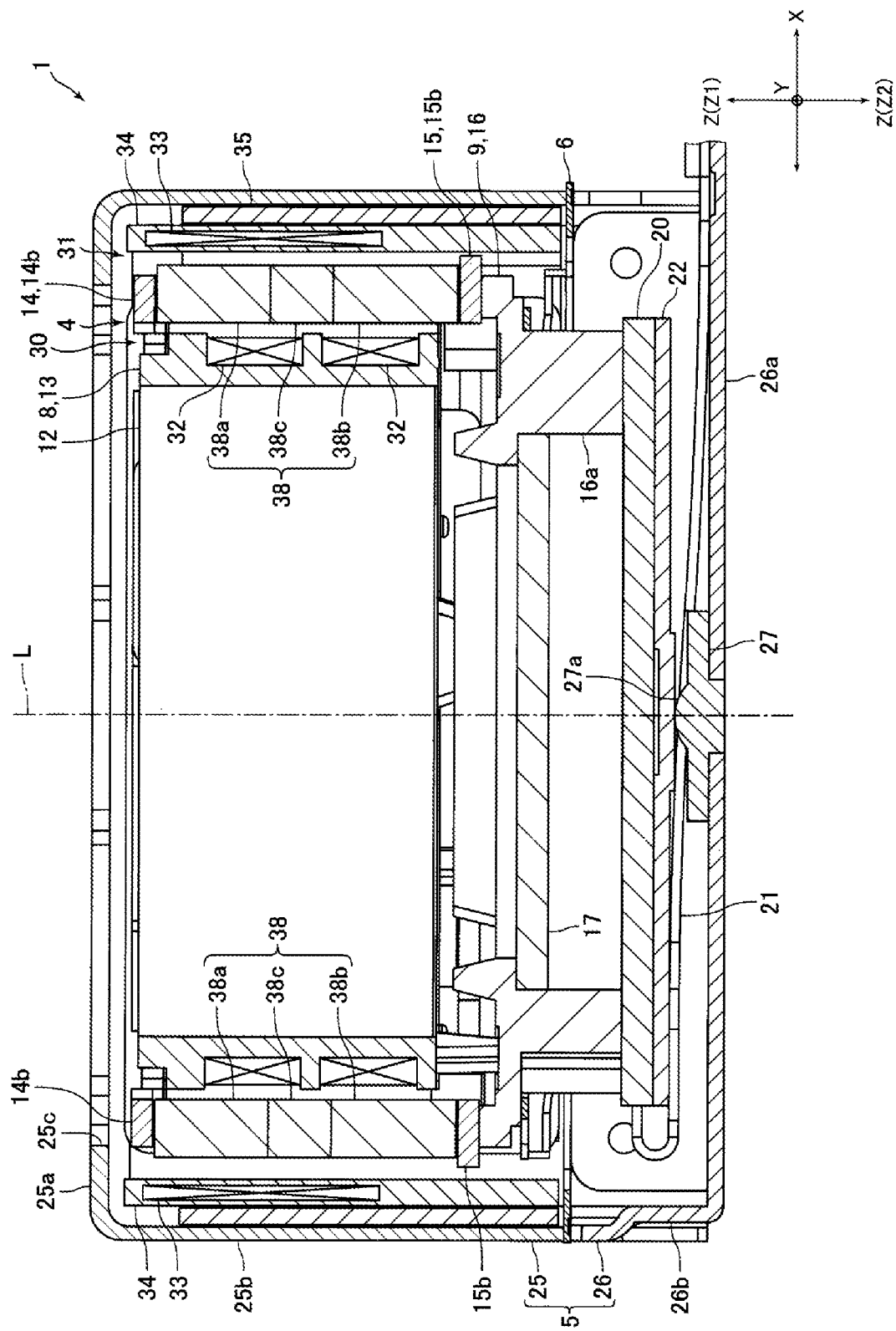
FIG. 3 is a cross-sectional view showing the "E-E" cross section in FIG. 2.
Figure 4:
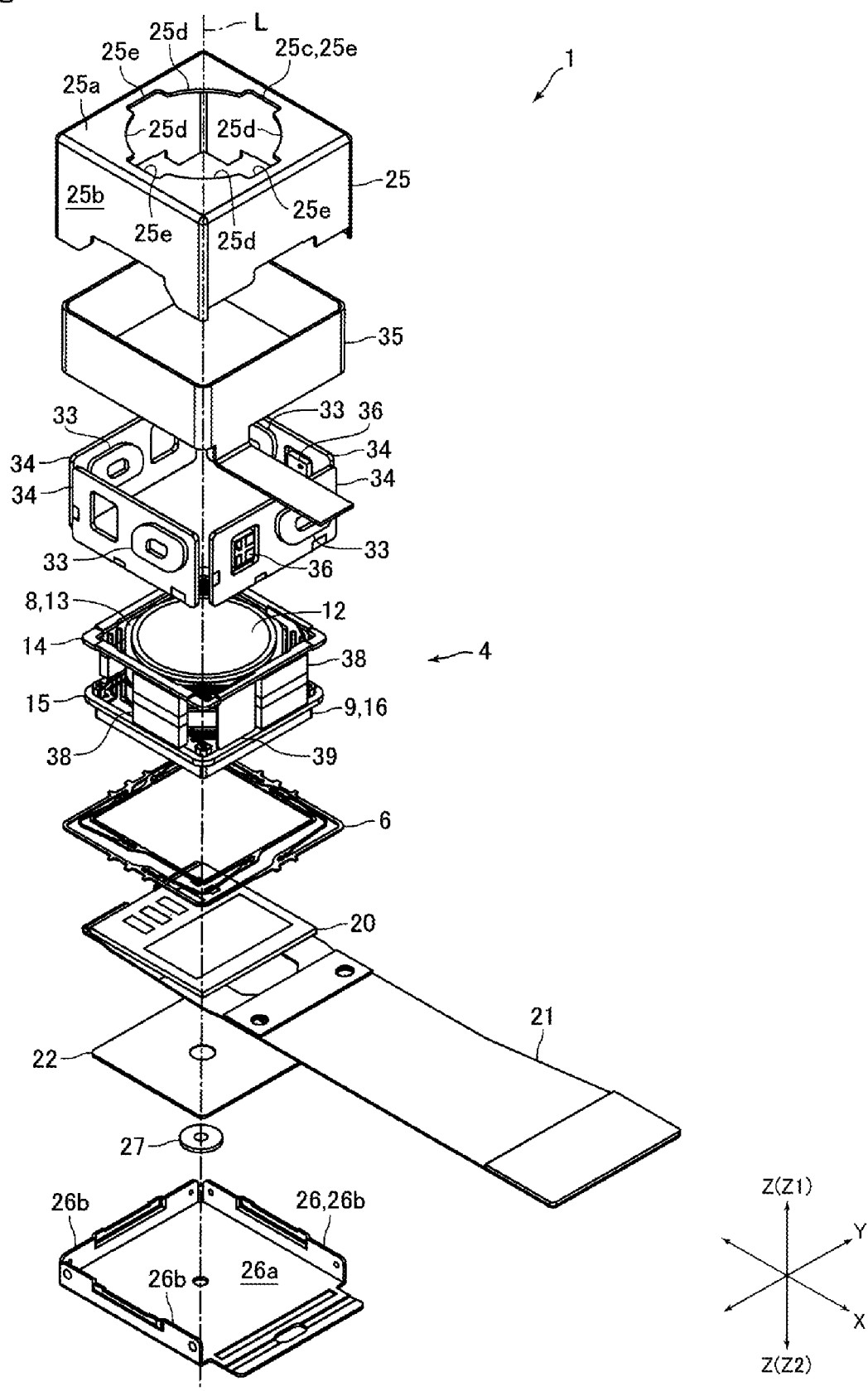
FIG. 4 is an exploded perspective view showing the photographing optical device in FIG. 1.
Figure 5:
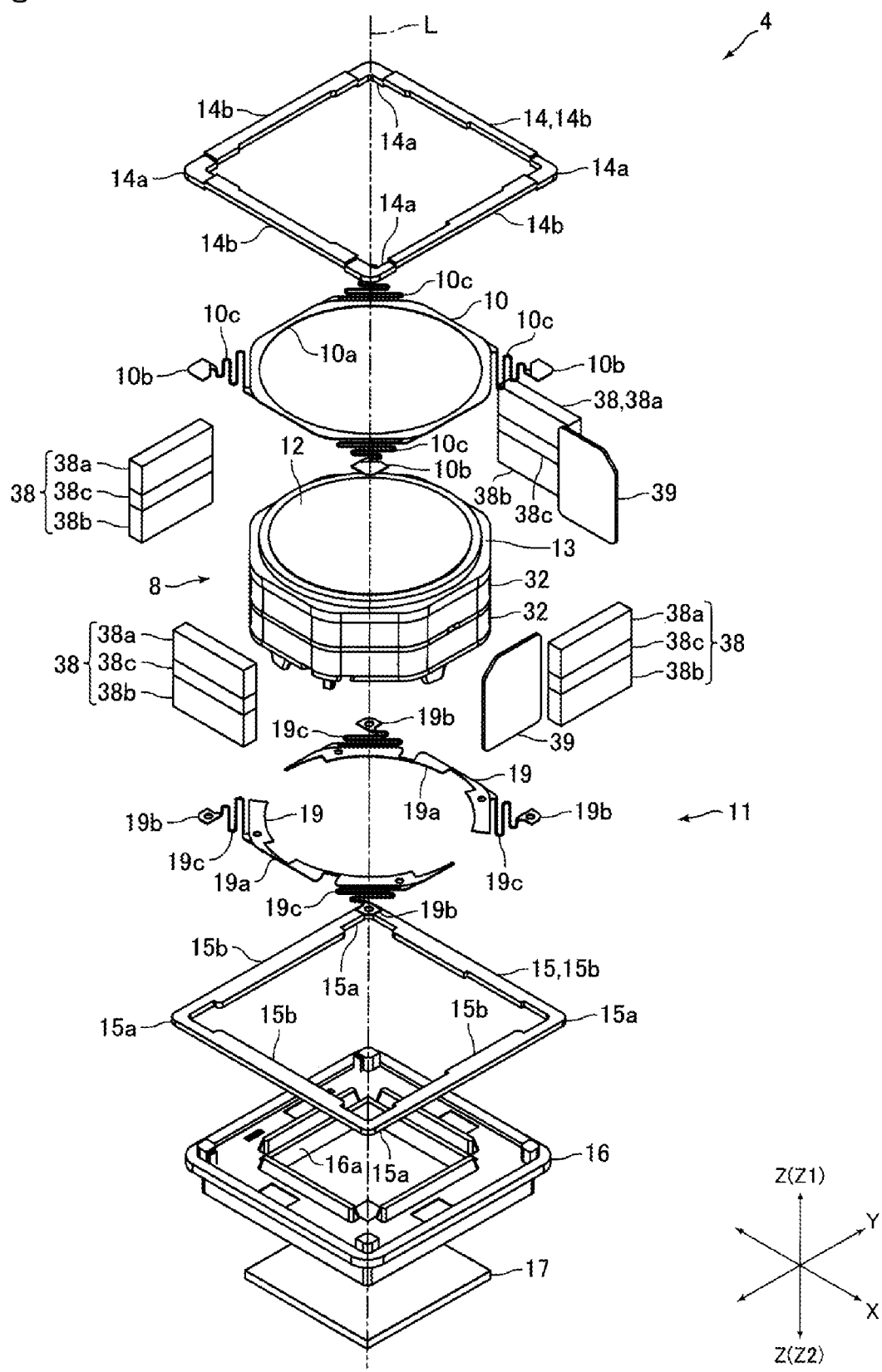
FIG. 5 is an exploded perspective view showing a movable module in FIG. 3.

FIG. 1 is a perspective view showing a photographing optical device 1 in accordance with an embodiment of the present invention. FIG. 2 is a plan view showing the photographing optical device 1 in FIG. 1. FIG. 3 is a cross-sectional view showing the "E-E" cross section in FIG. 2. FIG. 4 is an exploded perspective view showing the photographing optical device 1 in FIG. 1. FIG. 5 is an exploded perspective view showing a movable module 4 in FIG. 3. In the following descriptions, as shown in FIG. 1, respective three directions perpendicular to each other are set to be an "X" direction, a "Y" direction and a "Z" direction, and the "X" direction is referred to as a right and left direction, the "Y" direction is referred to as a front and rear direction, and the "Z" direction is referred to as an upper and lower direction. Further, a "Z1" direction side is referred to as an "upper" side and a "Z2" direction side is referred to as a "lower" side in FIG. 1 and the like.

A photographing optical device 1 in this embodiment is a small and thin camera which is mounted on a portable apparatus such as a cell phone, a drive recorder, a monitor camera system or the like and is provided with an autofocus function and a shake correction function. The photographing optical device 1 is formed in a substantially quadrangular prism shape as a whole. In this embodiment, the photographing optical device 1 is formed in a substantially square shape when viewed in a direction of an optical axis "L" (optical axis direction) of a lens for photographing and four side faces of the photographing optical device 1 are substantially parallel to planes formed of the right and left direction and the upper and lower direction (in other words, the "Z-X" plane formed of the "Z" direction and the "X" direction) or planes formed of the front and rear direction and the upper and lower direction (in other words, the "Y-Z" plane formed of the "Y" direction and the "Z" direction).

The photographing optical device 1 includes a movable module 4 on which a lens for photographing and an imaging element are mounted and a support body 5 which swingably holds the movable module 4. The movable module 4 is connected with the support body 5 through a plate spring 6 which is a first plate spring. In this embodiment, the upper and lower direction is substantially coincided with an optical axis direction of the movable module 4 when the movable module 4 is not swung. Further, in this embodiment, an imaging element is mounted on a lower end of the movable module 4 and an object to be photographed which is disposed on an upper side is photographed. In other words, in this embodiment, an upper side ("Z1" direction side) is an object to be photographed side (object side) which is one side in the optical axis direction and a lower side ("Z2" direction side) is an anti-object side (imaging element side, image side) which is the other side in the optical axis direction.

The movable module 4 is formed in a substantially quadrangular prism shape as a whole. In this embodiment, the movable module 4 is formed in a substantially square shape when viewed in the optical axis direction. This movable module 4 includes a movable body 8 which holds a lens and is movable in the optical axis direction and a holding body 9 which movably holds the movable body 8 in the optical axis direction. The movable body 8 is movably held by the holding body 9 through a plate spring 10 connecting the movable body 8 with the holding body 9 on an upper end side of the movable body 8 and a plate spring 11 connecting the movable body 8 with the holding body 9 on a lower end side of the movable body 8. The plate springs 10 and 11 in this embodiment are second plate springs which respectively connect the movable body 8 with the holding body 9 on both end sides of the movable body 8 in the optical axis direction.

The movable body 8 includes a lens holder 12 to which a plurality of lenses are fixed and a sleeve 13 which holds the lens holder 12. The holding body 9 includes a magnet fixing member 14 as a first magnet fixing member to which upper end faces (end faces on an object side) of drive magnets 38 described below are fixed, a magnet fixing member 15 as a second magnet fixing member to which lower end faces (end faces on an anti-object side) of the drive magnets 38 are fixed, and a base member 16 which structures a lower end side portion of the movable module 4.

The lens holder 12 is formed in a substantially cylindrical tube shape. A plurality of lenses is fixed to an inner peripheral side of the lens holder 12. The sleeve 13 is formed of resin material. Further, the sleeve 13 is formed in a substantially tube shape. Specifically, the sleeve 13 is formed in a substantially tube shape whose inner periphery of the sleeve 13 when viewed in the optical axis direction is formed in a circular shape and whose outer periphery of the sleeve 13 when viewed in the optical axis direction is formed in a substantially octagonal shape. In this embodiment, an outer peripheral face of the sleeve 13 is formed in a substantially regular octagonal shape when viewed in the optical axis direction. The sleeve 13 holds the lens holder 12 on its inner peripheral side. In other words, an outer peripheral face of the lens holder 12 is fixed to an inner peripheral face of the sleeve 13.

In this embodiment, an outer peripheral face of the sleeve 13 is an outer peripheral face of the movable body 8 and thus the outer peripheral face of the movable body 8 is formed in a substantially regular octagonal shape when viewed in the optical axis direction. When the movable body 8 is viewed in the optical axis direction in a state that the movable module 4 is not swung, two parallel sides of eight sides of the outer peripheral face of the movable body 8 formed in a substantially octagonal shape are substantially parallel to the "Z-X" plane, and two sides which are perpendicular to the two parallel sides and are parallel to each other are substantially parallel to the "Y-Z" plane, and remaining four sides are inclined at substantially 45° with respect to the "Z-X" plane and the "Y-Z" plane.

The magnet fixing members 14 and 15 are, for example, formed of a nonmagnetic stainless-steel plate. Surfaces of the magnet fixing members 14 and 15 are formed with a nickel plated layer composed of nickel alloy containing nickel as a main component or composed of nickel. Further, the magnet fixing members 14 and 15 are formed in a frame shape. Specifically, the magnet fixing members 14 and 15 are formed in a substantially quadrangular frame shape when viewed in the optical axis direction. More specifically, the magnet fixing members 14 and 15 are formed in a substantially square frame shape when viewed in the optical axis direction.

In this embodiment, an inner peripheral end of the magnet fixing member 14 and an inner peripheral end of the magnet fixing member 15 are disposed at substantially the same position as each other in the front and rear direction and in the right and left direction. On the other hand, an outer peripheral end of the magnet fixing member 15 is disposed on an outer peripheral side relative to an outer peripheral end of the magnet fixing member 14 in the front and rear direction and in the right and left direction. In other words, an outward form of the magnet fixing member 15 is larger than an outward form of the magnet fixing member 14. The movable body 8 is disposed on inner peripheral sides of the magnet fixing members 14 and 15 formed in a frame shape.

The magnet fixing member 14 is structured of four corner parts 14a in a substantially "L"-shape structuring respective four corner portions of the magnet fixing member 14 and four straight side parts 14b in a straight shape which respectively connect two corner parts 14a with each other. Two of four straight side parts 14b which are parallel to each other are disposed so as to be substantially parallel to the right and left direction and remaining two straight side parts 14b which are parallel to each other are disposed so as to be substantially parallel to the front and rear direction. As shown in FIG. 5, an upper face of the corner part 14a is disposed on a lower side relative to an upper face of the straight side part 14b, and an under face of the corner part 14a is disposed on a lower side relative to an under face of the straight side part 14b.

The magnet fixing member 15 is structured of four corner parts 15a in a substantially "L"-shape which respectively structure four corner portions of the magnet fixing member 15 and four straight side parts 15b in a straight shape which connect two corner parts 15a with each other. Two of four straight side parts 15b which are parallel to each other are disposed so as to be substantially parallel to the right and left direction and remaining two straight side parts 15b which are parallel to each other are disposed so as to be substantially parallel to the front and rear direction. As shown in FIG. 5, an upper face of the corner part 15a is disposed on the same plane as an upper face of the straight side part 15b and an under face of the corner part 15*a* is disposed on the same plane as an under face of the straight side part 15*b*.

The base member 16 is formed in a flat and substantially rectangular prism shape. A center of the base member 16 is formed with a through-hole 16*a* and the base member 16 is formed in a substantially square frame shape when viewed in the optical axis direction. An upper end face of the base member 16 is fixed to the under face of the magnet fixing member 15. An IR cut filter 17 is fixed to the through-hole 16*a*.

The plate spring 10 is provided with a movable body fixed part 10*a* which is fixed to an upper end side of the sleeve 13 of the movable body 8, four holding body fixed parts 10*b* which are fixed to the magnet fixing member 14, and spring parts 10*c* connecting the movable body fixed part 10*a* with the holding body fixed parts 10*b*. The plate spring 10 is fixed to the sleeve 13 and the magnet fixing member 14 so that its thickness direction and the upper and lower direction are substantially coincided with each other.

The movable body fixed part 10*a* is formed in a frame shape whose inner periphery is formed in a circular shape and whose outer periphery is formed in a substantially octagonal shape. The holding body fixed part 10*b* is formed in a substantially pentagonal shape. The spring part 10*c* is formed in a meandered line shape so that a desired spring characteristic is obtained. Four holding body fixed parts 10*b* are disposed on an outer peripheral side with respect to the movable body fixed part 10*a*. Further, each of four holding body fixed parts 10*b* is fixed to each of the under faces (face on an anti-object side) of four corner parts 14*a* of the magnet fixing member 14. The spring part 10*c* is disposed between the corner part 14*a* of the magnet fixing member 14 and the movable body fixed part 10*a*. In other words, the spring parts 10*c* are disposed between four corner portions of the magnet fixing member 14 and the movable body 8.

The plate spring 11 is structured of two spring pieces 19. The spring piece 19 is provided with a movable body fixed part 19*a* which is fixed to a lower end side of the sleeve 13 of the movable body 8, two holding body fixed parts 19*b* which are fixed to the magnet fixing member 15, and spring parts 19*c* connecting the movable body fixed part 19*a* with the holding body fixed parts 19*b*. The plate spring 11 is fixed to the sleeve 13 and the magnet fixing member 15 so that its thickness direction and the upper and lower direction are substantially coincided with each other.

The movable body fixed part 19*a* is formed in a substantially semicircular shape. The holding body fixed part 19*b* is formed in a substantially quadrangular shape. The spring part 19*c* is formed in a meandered line shape so that a desired spring characteristic is obtained. Two holding body fixed parts 19*b* of one of two spring pieces 19 and two holding body fixed parts 19*b* of the other spring piece 19 are respectively disposed on outer peripheral sides of the movable body fixed parts 19*a*. Further, two holding body fixed parts 19*b* of one of the spring pieces 19 and two holding body fixed parts 19*b* of the other spring piece 19 are respectively fixed to upper faces (face on an object side) of four corner parts 15*a* of the magnet fixing member 15. The spring part 19*c* is disposed between the corner part 15*a* of the magnet fixing member 15 and the movable body fixed part 19*b*. In other words, the spring parts 19*c* are disposed between four corner portions of the magnet fixing member 15 and the movable body 8.

In this embodiment, the plate spring 10 is fixed to the sleeve 13 and the magnet fixing member 14 in a resiliently bent state so as to urge the movable body 8 to a lower direction when the movable body 8 is located at a predetermined reference position where the lower end of the movable body 8 and the upper end face of the base member 16 are abutted with each other. In other words, the movable body fixed part 10*a* is fixed to the upper end side of the sleeve 13 and the holding body fixed parts 10*b* are fixed to the under faces of the corner parts 14*a* of the magnet fixing member 14 so that the movable body fixed part 10*a* is disposed on an upper side relative to the holding body fixed parts 10*b* when the movable body 8 is located at a reference position. Further, when the movable body 8 is located at a predetermined reference position, the plate spring 11 is fixed to the sleeve 13 and the magnet fixing member 15 so as not to apply an urging force or so as to urge the movable body 8 in the lower direction similarly to the plate spring 10.

An imaging element is mounted on a circuit board 20. The circuit board 20 is fixed to an under face of the base member 16. An FPC (flexible printed circuit board) 21 is connected with the circuit board 20. The FPC 21 is led around on a lower end side of the photographing optical device 1 and is extended out from a side face of the photographing optical device 1. An abutting plate 22 with which a support point member 27 described below is abutted is fixed to an under face of the circuit board 20.

The support body 5 includes a case body 25 which structures four side faces of the support body 5 in the front and rear direction and the right and left direction and a lower case body 26 which structures a lower end side portion of the support body 5. In this embodiment, the case body 25 structures four side faces of the photographing optical device 1 in the front and rear direction and the right and left direction and the lower case body 26 structures a lower end side portion of the photographing optical device 1.

The case body 25 is, for example, formed of nonmagnetic metal material. Further, the case body 25 is formed in a substantially bottomed rectangular tube shape which is provided with a bottom part 25*a* formed in a substantially quadrangular flat plate shape and a tube part 25*b* formed in a substantially rectangular tube shape. The bottom part 25*a* in this embodiment is formed in a substantially square flat plate shape. Further, the bottom part 25*a* is connected with an upper end of the tube part 25*b* and structures an upper end face (in other words, an end face on an object side) of the case body 25. The case body 25 is disposed so that its axial direction and the upper and lower direction are substantially coincided with each other. Further, the case body 25 is disposed so as to cover the movable module 4 and a lens drive mechanism 30 and a shake correction mechanism 31 described below from an outer peripheral side. A specific structure of the case body 25 will be described below.

The lower case body 26 is, as shown in FIG. 4, structured of a bottom part 26*a* which is formed in a substantially square flat plate shape and three side face parts 26*b* which are respectively stood up to an upper side from three sides of the bottom part 26*a*. The bottom part 26*a* of the lower case body 26 structures an under face of the photographing optical device 1. A support point member 27 is fixed to a center of the bottom part 26*a*. The support point member 27 is formed with a supporting point part 27*a* which is protruded to an upper side and serves as a supporting point for swinging of the movable module 4. The surface of the supporting point part 27*a* is formed in a curved shape in which a part of a spherical face is cut off. The supporting point part 27*a* is abutted with the abutting plate 22.

The plate spring 6 is provided with a movable side fixed part which is fixed to the movable module 4, a support side fixed part which is fixed to the support body 5, and four arm parts connecting the movable side fixed part with the support side fixed part. The movable side fixed part is fixed to a lower end side of the movable module 4 and the support side fixed part is fixed to an upper end of the side face part 26*b* of the lower case body 26 and thus the plate spring 6 connects the movable module 4 with the support body 5 on a lower end side (in other words, anti-object side). In this embodiment, the arm parts are resiliently bent with respect to the support side fixed part and thereby swing operation of the movable module 4 which is fixed to the movable side fixed part can be performed. The plate spring 6 is fixed in a resiliently bent state so as to generate pressurization for surely abutting the supporting point part 27*a* with the abutting plate 22 (in other words, so that an urging force for urging the movable module 4 in the lower direction is generated).

Further, the photographing optical device 1 includes a lens drive mechanism 30 for driving the movable body 8 in the optical axis direction with respect to the holding body 9 and a shake correction mechanism 31 for correcting a shake such as a hand shake by swinging the movable module 4 with respect to the support body 5. Structures of the lens drive mechanism 30 and the shake correction mechanism 31 will be described below.

(Structures of Lens Drive Mechanism and Shake Correction Mechanism)

An outer peripheral face of the sleeve 13 is attached with two lens drive coils 32 structuring the lens drive mechanism 30. The lens drive coil 32 is wound around along the outer peripheral face of the sleeve 13. Two lens drive coils 32 are wound around so that their winding directions are different from each other. Further, two lens drive coils 32 are fixed to the outer peripheral face of the sleeve 13 with a predetermined space therebetween in the upper and lower direction.

Sheet-shaped coils 34 each of which is integrally provided with a coil part 33 as a shake correction coil structuring the shake correction mechanism 31 are respectively disposed on inner sides of four side faces structuring the tube part 25*b* of the case body 25. In other words, four sheet-shaped coils 34 are disposed on an inner peripheral side of the tube part 25*b*. The sheet-shaped coil 34 is a flexible printed coil (FP coil) which is structured so that the coil part 33 made of minute copper wiring is formed on a printed circuit board. The coil part 33 is formed in a substantially rectangular frame shape and is disposed so that its long side portions are overlapped with each other in the upper and lower direction. Further, a surface of the coil part 33 is covered with an insulation film.

Four sheet-shaped coils 34 are electrically connected with an FPC 35 for relaying. The FPC 35 is disposed on an inner peripheral side of the tube part 25*b* in a bent state in a substantially rectangular tube shape. The four sheet-shaped coils 34 are fixed to an inner peripheral face of the FPC 35 which is bent in a substantially rectangular tube shape and an outer peripheral face of the FPC 35 is fixed to an inner peripheral face of the tube part 25*b*. In other words, four sheet-shaped coils 34 are fixed to the inner peripheral face of the tube part 25*b* through the FPC 35. The FPC 35 is connected with an FPC 21. A photo reflector 36 for detecting a position of the movable module 4 with respect to the support body 5 is mounted on one of two sheet-shaped coils 34 which are disposed substantially parallel to the "Z-X" plane and one of two sheet-shaped coils 34 which are disposed parallel to the "Y-Z" plane.

A drive magnet 38 which is formed in a substantially rectangular flat plate shape is fixed to each of four straight side parts 14*b* of the magnet fixing member 14 and each of four straight side parts 15*b* of the magnet fixing member 15. In four drive magnets 38 which are fixed to the magnet fixing members 14 and 15, two drive magnets 38 disposed parallel to each other are disposed substantially parallel to the "Z-X" plane and remaining two drive magnets 38 disposed parallel to each other are disposed substantially parallel to the "Y-Z" plane.

The drive magnet 38 is a neodymium magnet containing neodymium, iron and boron as main components. The drive magnet 38 is structured of two magnet pieces, i.e., a first magnet piece 38*a* and a second magnet piece 38*b* which are formed in a substantially rectangular flat plate shape, and a magnetic member 38*c* which is disposed between the first magnet piece 38*a* and the second magnet piece 38*b*. Specifically, the first magnet piece 38*a*, the second magnet piece 38*b* and the magnetic member 38*c* are adhesively bonded and fixed to each other in a state that the magnetic member 38*c* is sandwiched between an under face of the first magnet piece 38*a* and an upper face of the second magnet piece 38*b* and thereby the drive magnet 38 is formed. A surface of the drive magnet 38 is formed with a nickel plated layer composed of nickel alloy containing nickel as a main component or composed of nickel.

The drive magnet 38 is magnetized so that a magnetic pole formed on one side face and a magnetic pole formed on the other side face are different from each other. In other words, the drive magnet 38 disposed substantially parallel to the "Z-X" plane is magnetized so that a magnetic pole formed on a front side face of the drive magnet 38 and a magnetic pole formed on its rear side face are different from each other. Further, the drive magnet 38 disposed substantially parallel to the "Y-Z" plane is magnetized so that a magnetic pole formed on a right side face of the drive magnet 38 and a magnetic pole formed on its left side face are different from each other.

The side face of the drive magnet 38 is magnetized so that two different magnetic poles are overlapped with each other in the upper and lower direction. Specifically, the drive magnet 38 disposed substantially parallel to the "Z-X" plane is magnetized so that a magnetic pole formed on an outer side face of the first magnet piece 38*a* and a magnetic pole formed on an outer side face of the second magnet piece 38*b* in the front and rear direction are different from each other (in other words, a magnetic pole formed on an inner side face of the first magnet piece 38*a* and a magnetic pole formed on an inner side face of the second magnet piece 38*b* in the front and rear direction are different from each other). Further, the drive magnet 38 disposed substantially parallel to the "Y-Z" plane is magnetized so that a magnetic pole formed on an outer side face of the first magnet piece 38*a* and a magnetic pole formed on an outer side face of the second magnet piece 38*b* in the right and left direction are different from each other (in other words, a magnetic pole formed on an inner side face of the first magnet piece 38*a* and a magnetic pole formed on an inner side face of the second magnet piece 38*b* in the right and left direction are different from each other).

In this embodiment, four drive magnets 38 are disposed so that all magnetic poles on inner side faces of four first magnet pieces 38*a* are the same magnetic poles as each other (in other words, all magnetic poles on inner side faces of four second magnet pieces 38*b* are the same magnetic poles as each other). In other words, in this embodiment, four drive magnets 38 are disposed so that all magnetic poles on outer side faces of four first magnet pieces 38*a* are the same magnetic poles as each other (in other words, all magnetic poles on outer side faces of four second magnet pieces 38*b* are the same magnetic poles as each other).

Inner side faces of the first magnet pieces 38a in the front and rear direction or the right and left direction face an outer peripheral face of one of two lens drive coils 32 through a predetermined gap space, and inner side faces of the second magnet pieces 38b in the front and rear direction or the right and left direction face an outer peripheral face of the other lens drive coil 32 through a predetermined gap space. Further, outer side faces of the first magnet pieces 38a in the front and rear direction or the right and left direction face one of two long side portions of the coil part 33 through a predetermined gap space, and outer side faces of the second magnet pieces 38b in the front and rear direction or the right and left direction face the other of two long side portions of the coil part 33 through a predetermined gap space.

In this embodiment, the lens drive mechanism 30 is structured of the lens drive coils 32 and the drive magnets 38 and, when an electric current is supplied to the lens drive coils 32, the lens is moved in the optical axis direction together with the movable body 8. Further, in this embodiment, the shake correction mechanism 31 is structured of the coil parts 33 and the drive magnets 38 and, when a variation of inclination of the photographing optical device 1 is detected by a gyroscope disposed on an outer side of the photographing optical device 1, an electric current is supplied to the coil parts 33 based on a detected result by the gyroscope. Further, when an electric current is supplied to the coil parts 33, the movable module 4 is swung so as to incline the optical axis "L" with the supporting point part 27a as a swing center to correct the shake.

The magnet fixing members 14 and 15 are fixed with a reflecting plate 39 for reflecting light from a light emitting element of the photo reflector 36 to a light receiving element of the photo reflector 36. Further, in this embodiment, the inner side faces of the drive magnets 38 in the front and rear direction or the right and left direction are first opposed faces facing the lens drive coil 32, and the outer side faces of the drive magnets 38 in the front and rear direction or the right and left direction are second opposed faces facing the coil parts 33 which are the shake correction coils.

As described above, the drive magnets 38 are fixed to the magnet fixing members 14 and 15. In this embodiment, the drive magnet 38 and the magnet fixing member 14 are joined to each other by a first joining layer comprised of tin based metal containing at least tin. Similarly, the drive magnet 38 and the magnet fixing member 15 are joined to each other by a second joining layer comprised of tin based metal containing at least tin. The first joining layer and the second joining layer are structured of tin, tin alloy containing copper, tin alloy containing gold, tin alloy containing silver, tin alloy containing bismuth, or the like.

A surface of the drive magnet 38 before fixed to the magnet fixing members 14 and 15 is formed with a tin plated layer, which becomes the first joining layer and the second joining layer after being joined, so as to cover the nickel plated layer. In order to fix the drive magnets 38 to the magnet fixing members 14 and 15, in a state that four drive magnets 38 are sandwiched between the magnet fixing member 14 and the magnet fixing member 15, while pressurized so that the magnet fixing member 14 and the drive magnets 38 are firmly contacted and the magnet fixing member 15 and the drive magnets 38 are firmly contacted, the magnet fixing members 14 and 15 and the drive magnets 38 are heated and then cooled. When the magnet fixing members 14 and 15 and the drive magnets 38 are heated, the tin plated layer on the surface of the drive magnet 38 is melted and then, when the magnet fixing members 14 and 15 and the drive magnets 38 are cooled, the melted tin based metal is solidified to form the first joining layer and the second joining layer and, as a result, the drive magnets 38 are fixed to the magnet fixing members 14 and 15.

Further, as shown in FIG. 3, the drive magnets 38 are fixed to the magnet fixing members 14 and 15 so that the inner side faces of the drive magnets 38 in the front and rear direction or the right and left direction are substantially coincided with the inner peripheral ends of the magnet fixing members 14 and 15 in the front and rear direction or the right and left direction. As described above, the outer peripheral end of the magnet fixing member 15 is disposed on an outer peripheral side relative to the outer peripheral end of the magnet fixing member 14 in the front and rear direction and the right and left direction. Further, in this embodiment, the outer peripheral end of the magnet fixing member 15 is protruded to an outer peripheral side relative to the outer side faces of the drive magnets 38 in the front and rear direction or the right and left direction. The magnet fixing member 15 in this embodiment functions as a stopper for restricting a swing range of the movable module 4 in the front and rear direction and the right and left direction when an impact is applied to the photographing optical device 1. In this embodiment, the outer peripheral end of the magnet fixing member 14 is disposed on an inner peripheral side relative to the outer side faces of the drive magnets 38 in the front and rear direction or the right and left direction.

(Structure of Case Body)

As described above, the case body 25 is provided with the bottom part 25a structuring an upper end face of the case body 25. The bottom part 25a is formed with a through-hole 25c penetrating through in the upper and lower direction. The through-hole 25c is formed so that its center and the optical axis "L" are substantially coincided with each other. A facing part 25d which is protruded toward an inner side in the radial direction of the lens is formed at an edge of the through-hole 25c. The facing part 25d is formed at four positions of the edge of the through-hole 25c at a substantially 90° pitch with the optical axis "L" as a center. In other words, four facing parts 25d are formed at the edge of the through-hole 25c with a predetermined space therebetween in a circumferential direction of the lens. A cut-out part 25e is formed between adjacent facing parts 25d in the circumferential direction of the lens.

An inner peripheral end of the facing part 25d is formed in a substantially ¼ circular arc shape with the optical axis "L" as a center. An inner peripheral end of the facing part 25d is disposed on an inner peripheral side relative to an outer peripheral face of the sleeve 13 (in other words, an outer peripheral face of the movable body 8) as shown in FIG. 2 and the facing part 25d is capable of abutting with a part of an upper end of the sleeve 13 (in other words, an end face on an object side of the movable body 8). In other words, the facing part 25d faces a part of the end face on the object side of the movable body 8 so as to be capable of abutting with a part of the end face on the object side of the movable body 8. A gap space in the optical axis direction between the end face on the object side of the movable body 8 and the facing part 25d is set so that the movable body 8 and the facing part 25d are not contacted with each other even when the movable module 4 is swung in a state that the movable body 8 has been moved to the upper limit during normal use of the photographing optical device 1.

The cut-out part 25e is formed in a substantially rectangular shape when viewed in the optical axis direction. An outer peripheral end of the cut-out part 25e is, as shown in FIG. 2, disposed on an outer peripheral side relative to an inner peripheral end of the magnet fixing member 14 and, when viewed in the optical axis direction, a part of the magnet fixing member 14 is exposed.

(Principal Effects in this Embodiment)

As described above, in this embodiment, the facing part 25d formed in the bottom part 25a of the case body 25 faces a part of an end face on the object side of the movable body 8 so as to be capable of abutting with the part of the end face on the object side of the movable body 8. Therefore, according to this embodiment, even when the bottom part of the cover member included in the photographing optical device described in Patent Literature 1 is not provided, a movable range on an object side of the movable body 8 can be restricted by utilizing the facing part 25d when an impact is applied to the photographing optical device 1. Accordingly, in this embodiment, the size in the optical axis direction of the photographing optical device 1 can be reduced by an amount of the bottom part of the cover member which is included in the conventional photographing optical device. In other words, according to this embodiment, the photographing optical device 1 can be made thinner than the conventional device.

In this embodiment, a swing range of the movable module 4 is also restricted by setting the facing part 25d to be abutted with the end face on the object side of the movable body 8 or the face on the object side of the magnet fixing member 14. In other words, the facing part 25d in this embodiment also functions for restricting a swing range of the movable module 4.

In this embodiment, the lens drive mechanism 30 for driving the movable body 8 in the optical axis direction with respect to the holding body 9 and the shake correction mechanism 31 for swinging the movable module 4 with respect to the support body 5 to correct a shake such as a hand shake are structured by using the common drive magnets 38. Therefore, according to this embodiment, the number of components can be reduced in comparison with a case that magnets for the lens drive mechanism 30 and magnets for the shake correction mechanism 31 are provided separately. Accordingly, in this embodiment, the size of the photographing optical device 1 can be reduced in the front and rear direction and the right and left direction.

In this embodiment, an outer peripheral end of the magnet fixing member 15 is protruded to an outer peripheral side relative to the outer side faces of the drive magnets 38 in the front and rear direction or the right and left direction and thus the magnet fixing member 15 functions as a stopper for restricting a swing range of the movable module 4 in the front and rear direction and in the right and left direction when an impact is applied to the photographing optical device 1. Therefore, according to this embodiment, without separately providing a stopper for restricting a swing range of the movable module 4 in the front and rear direction and the right and left direction, the swing range of the movable module 4 can be restricted to prevent damage of the plate spring 6. Accordingly, in this embodiment, while the structure of the photographing optical device 1 is simplified, damage of the plate spring 6 can be prevented.

In this embodiment, the movable body 8 whose outer peripheral face when viewed in the optical axis direction is formed in a substantially regular octagonal shape is disposed on inner peripheral sides of the magnet fixing members 14 and 15 whose shapes when viewed in the optical axis direction are substantially square frame shapes. Further, in this embodiment, the spring parts 10c of the plate spring 10 are disposed between the corner parts 14a of the magnet fixing member 14 and the movable body 8, and the spring parts 19c of the spring pieces 19 are disposed between the corner parts 15a of the magnet fixing member 15 and the movable body 8. In other words, in this embodiment, the spring parts 10c and 19c are disposed in spaces, which are easily dealt as dead spaces, between four corner portions of the magnet fixing members 14 and 15 and the movable body 8. Therefore, according to this embodiment, the size of the photographing optical device 1 can be reduced in the front and rear direction and the right and left direction. Alternatively, a diameter of the lens can be increased without increasing the size of the photographing optical device 1.

In this embodiment, an upper face of the corner part 14a of the magnet fixing member 14 is disposed on a lower side relative to an upper face of the straight side part 14b. Therefore, according to this embodiment, contacting of the corner part 14a of the magnet fixing member 14 with the case body 25 can be prevented when the movable module 4 is swung. Further, in this embodiment, an under face of the corner part 14a of the magnet fixing member 14 to which the holding body fixed part 10b of the plate spring 10 is fixed is disposed on a lower side relative to the upper face of the straight side part 14b. Therefore, according to this embodiment, an urging force of the movable body 8 to an anti-object side by the plate spring 10 can be increased.

In this embodiment, the cut-out part 25e is formed in the bottom part 25a of the case body 25 and, when viewed in the optical axis direction, a part of the magnet fixing member 14 is exposed. Therefore, according to this embodiment, when the photographing optical device 1 is to be assembled, aligning of the case body 25 with the magnet fixing member 14 in the optical axis direction can be performed by utilizing an end face on an object side of the magnet fixing member 14. In other words, in this embodiment, at a time of assembling of the photographing optical device 1, aligning of the case body 25 with the drive magnets 38 in the optical axis direction can be performed by utilizing the end face on an object side of the magnet fixing member 14. Further, in a case that the movable module 4 in an assembled state is attached to the case body 25, at a time of assembling of the photographing optical device 1, aligning of the movable module 4 with the magnet fixing member 14 in the optical axis direction can be performed by utilizing an end face on the object side of the magnet fixing member 14.

In this embodiment, the magnet fixing members 14 and 15 and the drive magnets 38 are joined to each other through the first joining layer and the second joining layer, which are formed so that tin plated layers on the surfaces of the drive magnets 38 before fixed to the magnet fixing members 14 and 15 are melted and solidified. Therefore, according to this embodiment, protruding of the first joining layer and the second joining layer can be prevented between the magnet fixing member 14 and the drive magnets 38 and between the magnet fixing member 15 and the drive magnets 38.

(Modified Embodiment of Movable Module)

Figure 6:
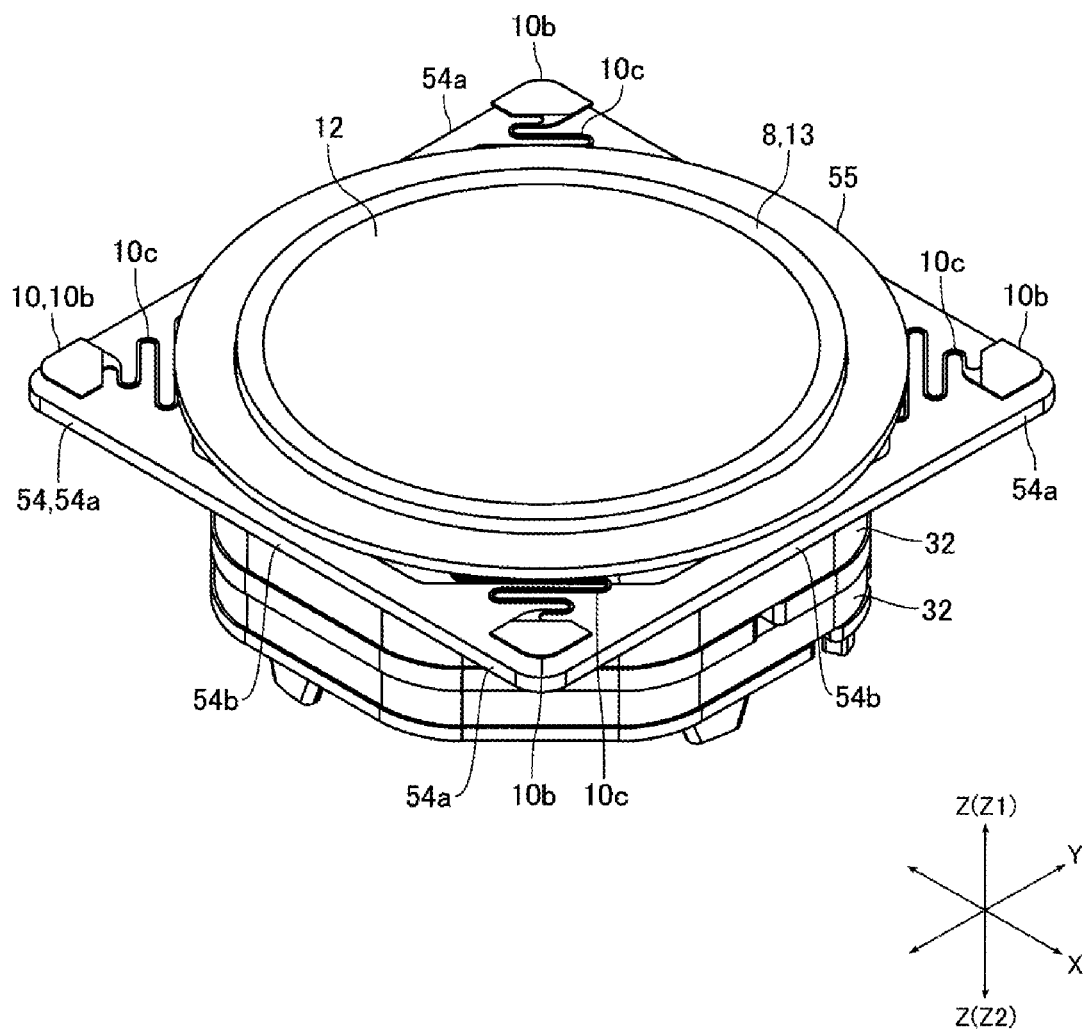
FIG. 6 is a perspective view for explaining a movable module in accordance with another embodiment of the present invention.
Figure 7:
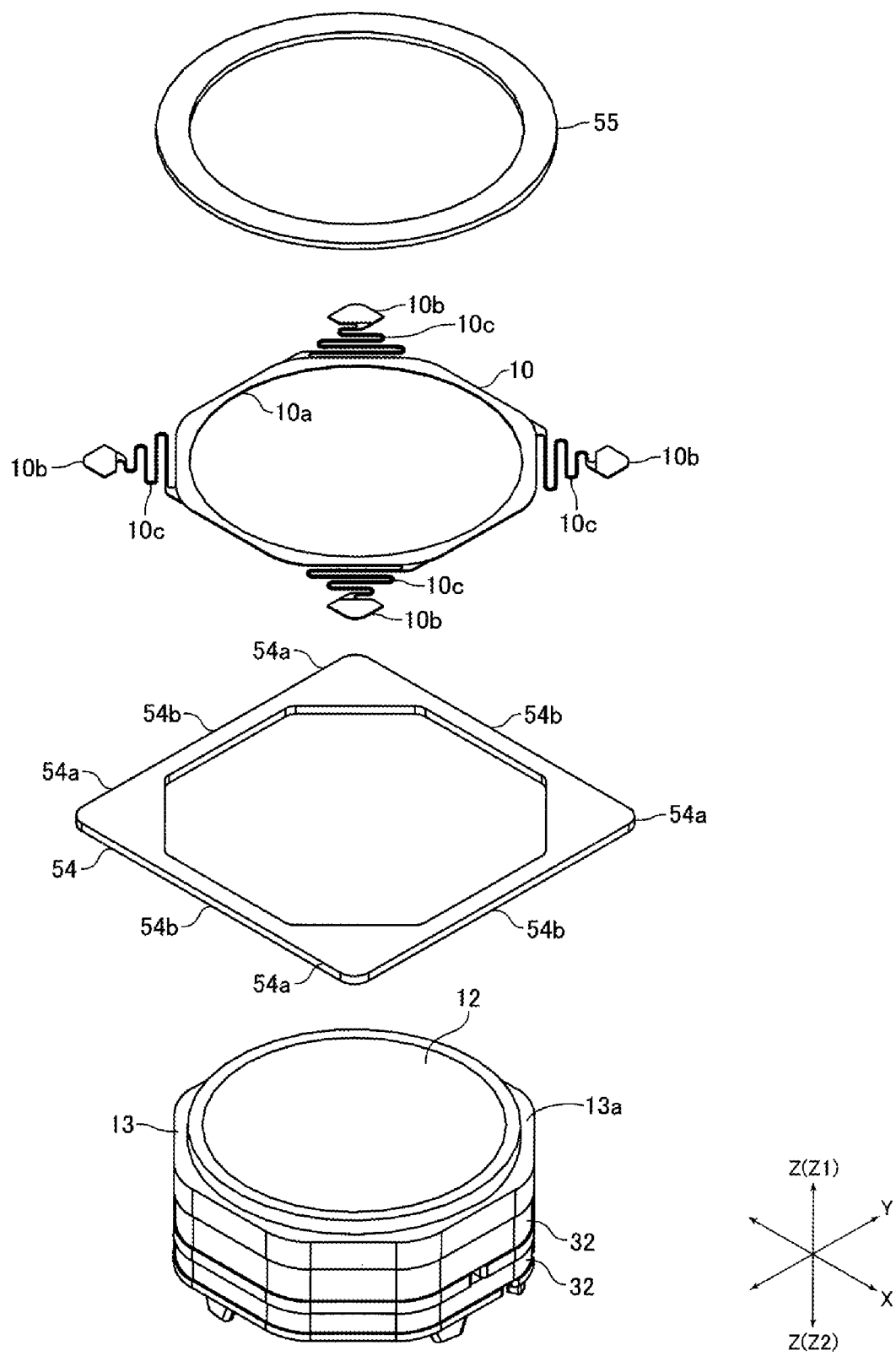
FIG. 7 is an exploded perspective view showing a plate spring, a sleeve, a magnet fixing member, a stopper and the like shown in FIG. 6.

FIG. 6 is a perspective view for explaining a movable module 4 in accordance with another embodiment of the present invention. FIG. 7 is an exploded perspective view showing a plate spring 10, a sleeve 13, a magnet fixing member 54, a stopper 55 and the like shown in FIG. 6. In FIGS. 6 and 7, the same structure as the embodiment described above is shown by using the same reference sign.

In the embodiment described above, the facing part 25d of the bottom part 25a structuring an upper end face of the case body 25 faces a part of an upper end of the sleeve 13 so as to be capable of abutting with the part of the upper end of the sleeve 13. However, the present invention is not limited to this embodiment. For example, the facing part 25d may be faced with a part of an upper face of a stopper 55 which is fixed to an upper end side of the sleeve 13 so as to be capable of abutting with the part of the upper face of the stopper 55 (see FIG. 6).

The stopper 55 is formed of metal material. Further, the stopper 55 is formed in a flat plate shape. In addition, the stopper 55 is formed in a ring shape whose outer peripheral end is formed in a circular shape. Specifically, the stopper 55 is formed in a circular ring shape whose inner peripheral end is also formed in a circular shape. An outer diameter of the stopper 55 is larger than an outer diameter of the sleeve 13 and the stopper 55 fixed to the upper end side of the sleeve 13 is enlarged to an outer peripheral side relative to the outer peripheral face of the sleeve 13. A gap space in the optical axis direction between the end face on an object side of the stopper 55 and the facing part 25*d* is set so that the stopper 55 and the facing part 25*d* are not contacted with each other even when the movable module 4 is swung in a state that the movable body 8 has been moved to the upper limit during normal use of the photographing optical device 1.

Also in this modified embodiment, when an impact is applied to the photographing optical device 1, a movable range on an object side of the movable body 8 can be restricted by utilizing the facing part 25*d* and the stopper 55. Therefore, similarly to the embodiment described above, the photographing optical device 1 can be made thinner than the conventional device.

In this embodiment, the bottom part 25*a* of the case body 25 is formed with the through-hole 25*c* for exposing a lens. Further, in the photographing optical device 1 in this embodiment, the lens holder 12 to which a lens is fixed is inserted and attached to an inner peripheral side of the sleeve 13 from an upper side in the final stage of assembling processes and thus the through-hole 25*c* is formed relatively large. Therefore, when the movable module 4 is swung or, when the movable body 8 is moved to an object side in a state that the movable module 4 is inclined with respect to the support body 5, the upper end of the movable body 8 may be projected from the case body 25 to an upper side without the upper end face of the movable body 8 being abutted with the facing part 25*d*.

In this modified embodiment, the movable body 8 is provided with the stopper 55 which is fixed to an upper end side of the sleeve 13, and the stopper 55 is enlarged to an outer peripheral side relative to an outer peripheral face of the sleeve 13. Therefore, when the movable module 4 is swung or, when the movable body 8 is moved to an object side in a state that the movable module 4 is inclined with respect to the support body 5, the stopper 55 structuring a part of an upper end face of the movable body 8 can be surely abutted with the facing part 25*d*. Especially, in this modified embodiment, the stopper 55 is formed in a ring shape whose outer peripheral end is formed in a circular shape and thus, even when the movable module 4 is inclined in any direction with respect to the support body 5, the stopper 55 can be surely abutted with the facing part 25*d*. Therefore, the upper end of the movable body 8 can be prevented from projecting out to an upper side from the case body 25.

Further, in the modified embodiment shown in FIGS. 6 and 7, the photographing optical device 1 includes a magnet fixing member 54 as the first magnet fixing member instead of the magnet fixing member 14. The magnet fixing member 54 is, similarly to the magnet fixing member 14, for example, formed of a nonmagnetic stainless-steel plate. Further, the magnet fixing member 54 is formed in a flat plate shape. In addition, the magnet fixing member 54 is formed in a substantially quadrangular frame shape when viewed in the optical axis direction. Specifically, the magnet fixing member 54 is formed in a frame shape whose inner peripheral end is formed in a substantially octagonal shape when viewed in the optical axis direction and whose outer peripheral end is formed in a substantially square shape when viewed in the optical axis direction. In other words, the magnet fixing member 54 is structured of four substantially triangular-shaped corner parts 54*a* which are respectively disposed at four corner portions of the magnet fixing member 54 and four straight side parts 54*b* in a straight shape which are disposed in parallel to the front and rear direction or the right and left direction to connect the corner parts 54*a* with each other.

The movable body fixed part 10*a* of the plate spring 10 is fixed to a spring fixing face 13*a* in a sandwiched state between the spring fixing face 13*a* (see FIG. 7) formed on an upper end side of the sleeve 13 and an under face of the stopper 55. The spring fixing face 13*a* is formed in a flat face shape perpendicular to the upper and lower direction and is formed in a circular ring shape. Further, each of four holding body fixed parts 10*b* is fixed to an upper face of each of the corner parts 54*a* which are disposed at four corner portions of the magnet fixing member 54.

As described above, the movable body fixed part 10*a* is fixed to the movable body 8 and the holding body fixed part 10*b* is fixed to the holding body 9 so that, when the movable body 8 is located at a reference position, the movable body fixed part 10*a* is disposed on an upper side relative to the holding body fixed part 10*b*. Therefore, in a case that the holding body fixed part 10*b* is fixed to an under face of the magnet fixing member 54 (or the magnet fixing member 14), the spring part 10*c* may be interfered with the magnet fixing member 54 (or the magnet fixing member 14). However, according to this modified embodiment, the holding body fixed part 10*b* is fixed to an upper face of the magnet fixing member 54 and thus the spring part 10*c* is prevented from being interfered with the magnet fixing member 54. Further, in a state that the movable body fixed part 10*a* is fixed to the sleeve 13, the holding body fixed part 10*b* of the plate spring 10 can be easily fixed to an upper face of the magnet fixing member 54 from an upper side and thus assembling of the photographing optical device 1 is easily performed. Further, in this modified embodiment, the movable body fixed part 10*a* of the plate spring 10 is fixed in a sandwiched state between the spring fixing face 13*a* and the under face of the stopper 55 and thus a fixed strength of the movable body fixed part 10*a* can be increased.

In this modified embodiment, the sleeve 13 and the stopper 55 are separately formed from each other and thus, even when the sleeve 13 is formed of resin material, the stopper 55 can be formed of metal material. Therefore, strength of the stopper 55 for restricting a movable range on an object side of the movable body 8 can be increased. Further, when the stopper 55 which is enlarged to an outer peripheral side relative to an outer peripheral face of the sleeve 13 is integrally formed with the sleeve 13, attaching of the movable body fixed part 10*a* to the movable body 8 may be difficult. However, in this modified embodiment, the sleeve 13 and the stopper 55 are separately formed from each other and thus, the stopper 55 can be attached after the movable body fixed part 10*a* has been fixed to the spring fixing face 13*a* of the sleeve 13 and, therefore, the movable body fixed part 10*a* can be easily attached to the movable body 8.

In this modified embodiment, the movable body fixed part 10*a* of the plate spring 10 is sandwiched between the spring fixing face 13*a* of the sleeve 13 and the stopper 55, and the stopper 55 is fixed to the sleeve 13 through the movable body fixed part 10a. However, the stopper 55 may be directly fixed to the sleeve 13. Further, in this modified embodiment, the shape of an inner peripheral end of the stopper 55 is a circular shape but the shape of the inner peripheral end of the stopper 55 may be a polygonal shape.

Other Embodiments

Although the present invention has been shown and described with reference to a specific embodiment, various changes and modifications will be apparent to those skilled in the art from the teachings herein.

In the embodiment described above, the case body 25 is formed in a substantially bottomed rectangular tube shape and the bottom part 25a and the tube part 25b are integrally formed with each other. However, the present invention is not limited to this embodiment. For example, the bottom part 25a and the tube part 25b which are separately formed may be fixed to each other.

In the embodiment described above, the magnet fixing members 14 and 15 are formed in a substantially square frame shape when viewed in the optical axis direction. However, the present invention is not limited to this embodiment. For example, the magnet fixing members 14 and 15 may be formed in a quadrangular frame shape other than a substantially square shape or may be formed in a polygonal frame shape other than a quadrangular shape. Further, the magnet fixing members 14 and 15 may be formed in a circular frame shape or in an elliptic frame shape.

In the embodiment described above, the magnet fixing member 15 functions as a stopper for restricting a swing range of the movable module 4 in the front and rear direction and the right and left direction. However, the present invention is not limited to this embodiment. For example, a stopper for restricting a swing range of the movable module 4 may be separately provided. In this case, for example, an outer peripheral end of the magnet fixing member 14 and an outer peripheral end of the magnet fixing member 15 are disposed at substantially the same position as each other in the front and rear direction and the right and left direction.

In the embodiment described above, the cut-out part 25e is formed in the bottom part 25a of the case body 25. However, no cut-out part 25e may be formed in the bottom part 25a of the case body 25. In this case, the bottom part 25a is formed with one facing part 25d in a ring shape. Further, in the embodiment described above, the magnet fixing members 14 and 15 and the drive magnets 38 are fixed to each other by the first joining layer and the second joining layer made of tin based metal. However, the magnet fixing members 14 and 15 and the drive magnet 38 may be fixed to each other by adhesion, soldering or the like.

In the embodiment described above, the drive magnet 38 is structured of the first magnet piece 38a, the second magnet piece 38b and the magnetic member 38c. However, the drive magnet 38 may be structured of the first magnet piece 38a and the second magnet piece 38b or may be structured of one magnet piece which is magnetized so that two different magnetic poles are arranged in the optical axis direction.

In the embodiment described above, the plate spring 10 is directly fixed to the magnet fixing member 14. However, the present invention is not limited to this embodiment. For example, the plate spring 10 may be fixed to the magnet fixing member 14 through a certain member. In this case, it may be structured that an upper face of the corner part 14a and an upper face of the straight side part 14b are disposed on the same plane and that an under face of the corner part 14a and an under face of the straight side part 14b are disposed on the same plane. Further, in the embodiment described above, the plate spring 11 is directly fixed to the magnet fixing member 15 but the plate spring 11 may be fixed to the magnet fixing member 15 through a certain member.

In the embodiment described above, the photographing optical device 1 is formed in a substantially square shape when viewed in the optical axis direction. However, the photographing optical device 1 may be formed in a substantially rectangular shape when viewed in the optical axis direction. Further, the photographing optical device 1 may be formed in another polygonal shape when viewed in the optical axis direction or may be formed in a circular shape or an elliptic shape when viewed in the optical axis direction.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A photographing optical device comprising:
    a movable module comprising:
        a movable body which holds a lens and is movable in an optical axis direction of the lens; and
        a holding body structured to movably hold the movable body in the optical axis direction;
    a support body structured to swingably hold the movable module;
    a lens drive coil which is attached to the movable body;
    a shake correction coil which is attached to the support body;
    a plurality of drive magnets having a first opposed face which faces the lens drive coil and a second opposed face which faces the shake correction coil, the drive magnets being attached to the holding body; and
    a first plate spring which connects the movable module with the support body on the anti-object side; and
    wherein when one side in the optical axis direction is an object side and the other side in the optical axis direction is an anti-object side, the holding body comprises:
        a first magnet fixing member to which end faces on the object side of the plurality of the drive magnets are fixed; and
        a second magnet fixing member to which end faces on the anti-object side of the plurality of the drive magnets are fixed;
    wherein the first magnet fixing member and the second magnet fixing member are formed in a frame shape;
    wherein the movable body is disposed on inner peripheral sides of the first magnet fixing member and the second magnet fixing member formed in the frame shape;
    wherein the support body comprises a case body structuring an outer peripheral face of the support body;
    wherein an object side end of the case body is formed with a facing part which faces a part of an end face on the object side of the movable body in the optical axis direction so as to be capable of abutting with the part of the end face on the object side of the movable body;

wherein the second magnet fixing member is formed so as to protrude to an outer peripheral side relative to the drive magnets, an outer peripheral surface of the second magnet fixing member faces the support body, and thereby a swing range of the movable module in a direction perpendicular to the optical axis direction is restricted, wherein the second magnet fixing member is structured to restrict the swing range by abutting the shake correction coil;

wherein second plate springs structured to connect the movable body with the holding body on both end sides of the movable body in the optical axis direction;

wherein the first magnet fixing member and the second magnet fixing member are formed in a substantially quadrangular frame shape when viewed in the optical axis direction;

wherein an outer peripheral face of the movable body is formed in a substantially octagonal shape when viewed in the optical axis direction;

wherein the second plate spring comprises:
 a movable body fixed part which is fixed to the movable body;
 a holding body fixed part which is fixed to the first magnet fixing member or the second magnet fixing member; and
 spring parts which are disposed between four corner portions of the first magnet fixing member or the second magnet fixing member and the movable body and are structured to connect the movable body fixed part with the holding body fixed part;
 wherein the first magnet fixing member is provided with four corner parts in a substantially "L"-shape respectively structuring the four corner portions of the first magnet fixing member whose shape when viewed in the optical axis direction is a substantially quadrangular frame shape and for straight side parts in a straight shape connecting the corner parts;
 the holding body fixed part of the second plate spring connecting the movable body with the holding body on the object side of the movable body is fixed to a face on the anti-object side of the corner part; and
 a face on the object side of the corner part is disposed on the anti-object side relative to a face on the object side of the straight side part, and a face on the anti-object side of the corner part is disposed on the anti-object side relative to a face on the anti-object side of the straight side part.

2. The photographing optical device according to claim 1, further comprising second plate springs structured to connect the movable body with the holding body on both end sides of the movable body in the optical axis direction,
 wherein the first magnet fixing member is formed in a substantially quadrangular frame shape when viewed in the optical axis direction,
 wherein the second plate spring which connects the movable body with the holding body on the object side of the movable body comprises:
  a movable body fixed part which is fixed to the movable body;
  holding body fixed parts which are fixed to the first magnet fixing member; and
  spring parts which connect the movable body fixed part with the holding body fixed parts, and
 wherein the holding body fixed parts of the second plate spring which connect the movable body with the holding body on the object side of the movable body are fixed to faces on the object side of four corner portions of the first magnet fixing member whose shape when viewed in the optical axis direction is a substantially quadrangular frame shape.

3. The photographing optical device according to claim 1, wherein
 the movable body comprises:
  a sleeve whose outer peripheral face is wound around and fixed with the lens drive coil; and
  a stopper which is fixed on the object side of the sleeve, the stopper is formed so as to enlarge to an outer peripheral side relative to the outer peripheral face of the sleeve, and
 at least a part of the stopper faces the facing part in the optical axis direction so as to be capable of abutting with the facing part.

4. The photographing optical device according to claim 3, wherein the stopper is formed in a ring shape whose outer peripheral end is formed in a circular shape.

5. The photographing optical device according to claim 3, further comprising second plate springs structured to connect the movable body with the holding body on both end sides of the movable body in the optical axis direction,
 wherein the second plate spring which connects the movable body with the holding body on the object side of the movable body comprises:
  a movable body fixed part which is fixed to the movable body;
  holding body fixed parts which are fixed to the first magnet fixing member; and
  spring parts which connect the movable body fixed part with the holding body fixed parts, and
 wherein the movable body fixed part of the second plate spring which connects the movable body with the holding body on the object side of the movable body is fixed in a sandwiched state between a spring fixing face formed on the object side of the sleeve and the stopper in the optical axis direction.

6. The photographing optical device according to claim 1, wherein an end face on the object side of the case body where the facing part is formed with a cut-out part for exposing a part of the first magnet fixing member when viewed in the optical axis direction.

7. The photographing optical device according to claim 1, wherein
 surfaces of the drive magnet, the first magnet fixing member and the second magnet fixing member are formed with a nickel plated layer containing at least nickel,
 the first magnet fixing member and the drive magnet are joined to each other by a first joining layer which is made of tin based metal containing at least tin and is disposed between the first magnet fixing member and the drive magnet, and
 the second magnet fixing member and the drive magnet are joined to each other by a second joining layer which is made of tin based metal containing at least tin and is disposed between the second magnet fixing member and the drive magnet.

8. The photographing optical device according to claim 7, further comprising a first plate spring which connects the movable module with the support body on the anti-object side,
 wherein the case body is formed in a substantially bottomed rectangular tube shape provided with a bottom part formed in a substantially quadrangular flat plate shape and a tube part formed in a substantially rectangular tube shape,
wherein the first plate spring is disposed on the anti-object side with respect to the second magnet fixing member, and
wherein the second magnet fixing member is formed so as to protrude to an outer peripheral side relative to the drive magnets.

9. The photographing optical device according to claim 1, wherein
the case body is formed in a substantially bottomed rectangular tube shape provided with a bottom part formed in a substantially quadrangular flat plate shape and a tube part formed in a substantially rectangular tube shape,
the bottom part is formed with a through-hole, and
the facing part is formed at an edge of the through-hole so as to protrude to an inner side in a radial direction of the lens.

10. The photographing optical device according to claim 1,
wherein the case body is formed in a substantially bottomed rectangular tube shape provided with a bottom part formed in a substantially quadrangular flat plate shape and a tube part formed in a substantially rectangular tube shape, and
wherein the first plate spring is disposed on the anti-object side with respect to the second magnet fixing member.

11. The photographing optical device according to claim 6, wherein
the case body is formed in a substantially bottomed rectangular tube shape provided with a bottom part formed in a substantially quadrangular flat plate shape and a tube part formed in a substantially rectangular tube shape,
the bottom part is formed with a through-hole,
a plurality of the facing parts is formed at an edge of the through-hole so as to protrude to an inner side in a radial direction of the lens, and
the cut-out part is formed between the facing parts in a circumferential direction of the lens.

12. The photographing optical device according to claim 11, further comprising a first plate spring which connects the movable module with the support body on the anti-object side,
wherein the second magnet fixing member is formed so as to protrude to an outer peripheral side relative to the drive magnets.

13. The photographing optical device according to claim 1, wherein the first magnet fixing member is structured such that, when viewed along the optical axis direction, an outer perimeter of the first magnet fixing member is formed in a substantially quadrangular frame shape and an inner perimeter of the first magnet fixing member is formed in a substantially quadrangular frame shape.

* * * * *